United States Patent
Maranzano

(12) 
(10) Patent No.: US 6,172,312 B1
(45) Date of Patent: Jan. 9, 2001

(54) COMBINATION TRANSMISSION GEAR SELECT AND AUXILIARY SWITCH LEVER

(75) Inventor: John M. Maranzano, Shelby Township, MI (US)

(73) Assignee: Valeo Electrical Systems, Inc., Auburn Hills, MI (US)

( * ) Notice: Under 35 U.S.C. 154(b), the term of this patent shall be extended for 0 days.

(21) Appl. No.: 09/421,739

(22) Filed: Oct. 20, 1999

(51) Int. Cl.$^7$ .................................................. H01H 9/00
(52) U.S. Cl. ................................. 200/61.28; 200/61.54
(58) Field of Search ............................... 200/4, 17 R, 18, 200/61.27, 61.28, 61.54, 61.85, 61.88, 332, 335

(56) References Cited

U.S. PATENT DOCUMENTS

| | | | |
|---|---|---|---|
| 4,414,424 | * 11/1983 | Takeda et al. | 200/61.88 |
| 5,099,720 | * 3/1992 | Raue | 74/866 |
| 5,107,243 | * 4/1992 | Maeda | 338/172 |
| 5,581,058 | * 12/1996 | Javery et al. | 200/4 |
| 5,854,458 | * 12/1998 | Ramamurthy et al. | 200/61.54 |
| 5,905,237 | * 5/1999 | Hayakawa et al. | 200/61.28 |

* cited by examiner

Primary Examiner—Michael Friedhofer
(74) Attorney, Agent, or Firm—J. Gordon Lewis

(57) ABSTRACT

A combined transmission gear shift selector and vehicle operating device switch lever includes an actuator movably mounted on a transmission shift lever for movement between distinct positions, each defining a separate circuit for activating a vehicle operating device or circuit. The actuator is movably mounted between spaced first and second end portions of the transmission shift lever which are rigidly joined for unitary movement. A printed circuit board carrying conductive traces and a contactor carrying leaf contacts are movably arranged with respect to each other on the actuator and the lever for defining circuits upon at least one of rotation and/or coaxial translation of the actuator relative to the lever. A detent and detent follower are formed on the actuator and one of the first and second end portions for defining distinct rotary positions of the actuator relative to the lever, each distinct position defining a separate vehicle operating device state. The actuator is optionally coaxially translatable relative to the lever and capable of closing a circuit upon such translational movement for controlling a vehicle operating device.

24 Claims, 1 Drawing Sheet

COMBINATION TRANSMISSION GEAR SELECT AND AUXILIARY SWITCH LEVER

BACKGROUND OF THE INVENTION

1. Field of the Invention

The present invention relates to switches and, more specifically, to vehicle steering column mounted switches for controlling vehicle operating circuits and components.

2. State of the Art

The evolution of steering column switches in motor vehicles has been toward greater integration of functions in a single switch lever. Previously, a plurality of individual switches, each controlling a single vehicle function, i.e., turn signals, windshield wipers, headlights, etc., were mounted on the vehicle dashboard or steering column. Current steering column switch levers are designed to control a variety of functions for vehicle operating circuits or devices, such as turn signals and hazard lights, high beam and low beam headlights with optional flash-to-pass, parking lights, fog lights, windshield wiper and wash functions, including multi-speed wipers with or without intermittent delay.

Typically, a steering column stalk switch includes a single lever or stalk pivotally mounted on one side of a housing attached to the vehicle steering column in an easily accessible position for access by the driver of the vehicle. The lever is gimballed at one end in housing so as to move in one and typically two mutually separate planes. Further, the lever may be provided with a rotatable end cap, and/or a slidable member movable along the longitudinal axis of the lever to control additional vehicle operating circuits. An intermediate member on the lever may also be rotatable to control another vehicle circuit or device.

Actuators are mounted in the housing and, in response to movement of the lever in different directions or planes, rotation of the end cap, or movement of the slidable member, or rotation of the intermediate member on the lever, move a switching member carrying contacts between various switching positions to effect the switching of electrical connections for a particular vehicle operating circuit.

In some vehicles, particularly vehicles manufactured in Europe and/or Japan, two steering column stalk switches are provided, one mounted on the left side of the steering column and one on the right side of the steering column. The various vehicle operating circuits or devices described above are split between the two stalk switches, with the left stalk switch typically controlling vehicle headlight, parking light, fog light, flash-to-pass headlight operation, as well as turn signal operations. The right mounted stalk lever typically operates windshield wiper, mist and wash devices.

Further, transmission gear select levers, have been predominantly mounted on the floor of the vehicle to take advantage of the simplified mechanical linkages with the transmission located beneath the front center of the passenger compartment of the vehicle. However, the trend toward electronic transmissions enables the transmission gear select switch to be moved back on the steering column. This, however, can interfere with the right side mounted stalk switch due to the limited space available on the steering column and the need to provide non-interfering rotation and access to each of the stalk switch and the transmission gear select switch.

It is known to provide column mounted transmission gear shift levers with an end mounted, on/off toggle switch to control a selected vehicle control circuit or device, such as traction control, overdrive, etc. However, this switch provides only a single circuit function and not multiple functions as typically provided by steering column stalk switch levers.

Thus, it would be desirable to provide a steering column switch lever which can combine the functions of a transmission gear select lever and a steering column stalk switch containing switchable elements for controlling various vehicle operating circuits and devices into a single lever which provides the functions of the previous two levers at a much lower cost.

SUMMARY OF THE INVENTION

The present invention is a combination transmission gear select and auxiliary switch lever mountable on a vehicle steering column.

According to one aspect of the invention, the lever has one end adjacent a vehicle steering column and an opposed outer end. An actuator is carried between the one end and the outer end of the lever and is capable of independent movement relative to the lever. Switch means are carried with the actuator for forming a circuit upon movement of the actuator from one position to another position. The circuit is connected to a vehicle operating device to control the activation and deactivation of the vehicle operating device in response to movement of the actuator.

In one aspect of the invention, the actuator is rotatably mounted on the lever. Alternately, the actuator is mounted for coaxial translation on the lever. Preferably, the actuator is mounted for both rotational and coaxial translation on the lever.

According to one aspect of the invention, a detent is formed on one of the actuator and the lever. A detent follower is formed on the other of the actuator and the lever and is movably engagable with the detent to define at least one distinct position of the actuator relative to the lever. Preferably, the detent follower comprises a biased plunger. Further, a plurality of circumferentially spaced detents are provided, each defining a distinct position of the actuator relative to the lever.

A printed circuit board or substrate carrying at least one conductive trace and, preferably, a plurality of conductive traces are fixedly mounted on one of the actuator and the lever. A contactor is carried by the other of the actuator and the lever and has at least one and, preferably, a plurality of electrical contacts mounted for engagement with the one or more conductive traces upon movement of the actuator to form separate circuits capable of controlling different vehicle operating devices or for controlling the operative state of a vehicle operating device.

The combined transmission gear select and auxiliary switch lever of the present invention uniquely provides a steering column stalk switch actuator capable of controlling multiple vehicle circuits or operating devices on a transmission gear select lever thereby combining the functions of a separate steering column stalk switch lever and a transmission lever into a single lever. This reduces manufacturing costs since only one lever is manufactured and mounted on a vehicle steering column as compared to the prior two levers consisting of a transmission gear select lever and a separate stalk switch lever.

The combined transmission gear select lever and auxiliary switch of the present invention also simplifies the steering column design since only one lever need be mounted on the right side of the steering column while still providing stalk switch and transmission gear select functions.

The combined transmission gear select and auxiliary switch lever of the present invention is adaptable for controlling many different vehicle operating circuits or devices. For example, the switch may be devised for controlling the complete windshield wiper drive, wash and mist operations as are typically found on a single steering column stalk switch. Alternately, or in combination with the windshield wiper control, the switch or actuator may be devised for controlling the vehicle headlamp, parking lamp and fog light operation.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENT

Figure 1:
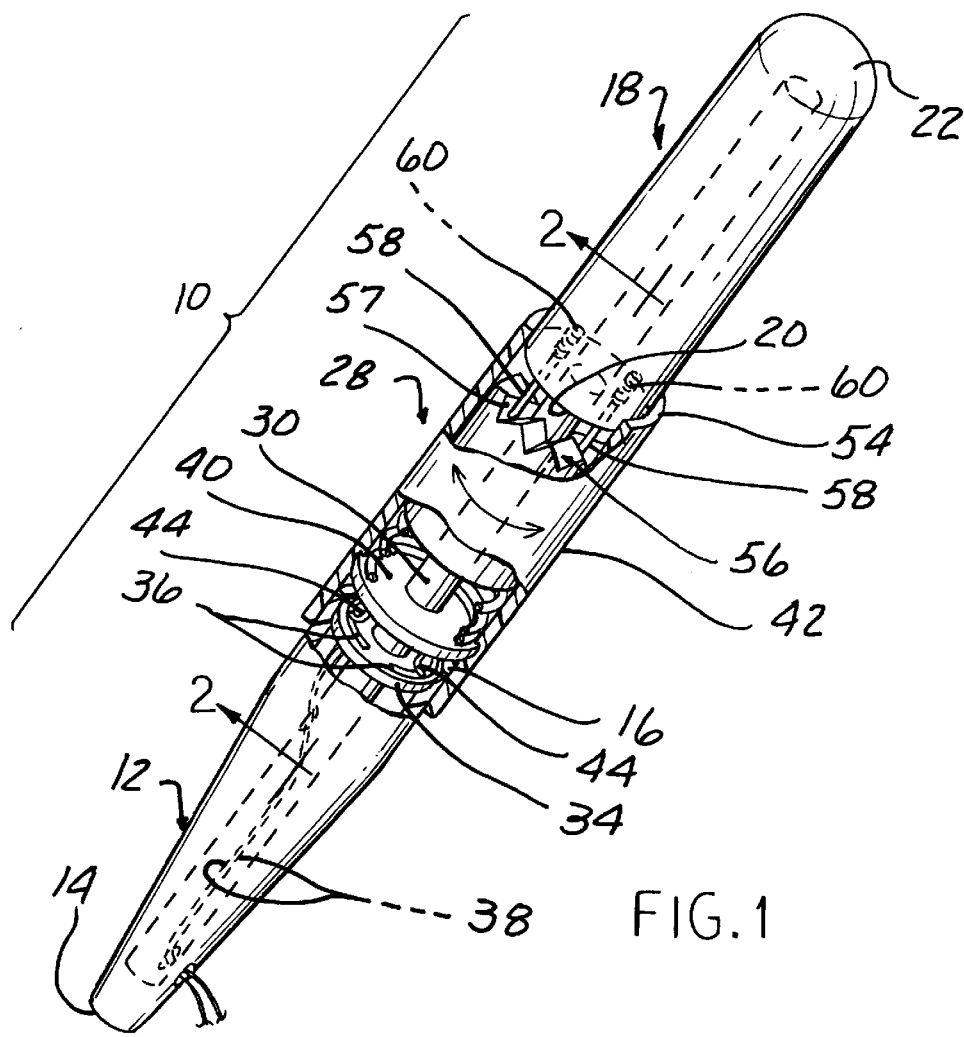
FIG. 1 is a perspective view of a combined transmission gear select and vehicle function switch lever according to the present invention.
Figure 2:
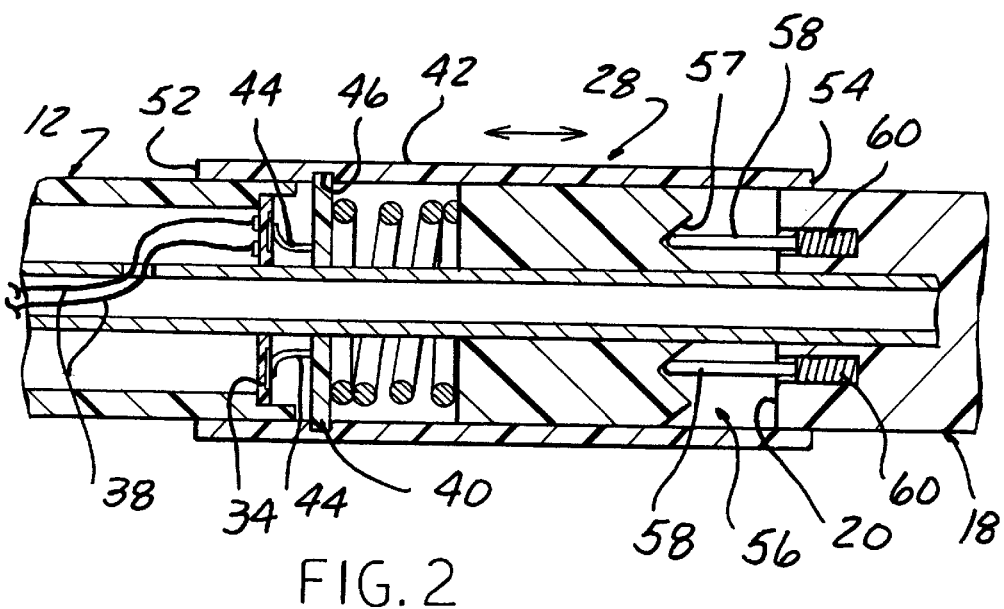
FIG. 2 is a cross-sectional view generally taken along line 2—2 in FIG. 1.

Referring now to FIGS. 1 and 2, there is depicted a combined transmission gear shift and auxiliary vehicle control switch lever 10 constructed in accordance with the teachings of the present invention. As the lever 10 is based on a steering column mounted, transmission gear shift lever, the pivotal and rotatable connection of the lever 10 to the vehicle steering column as well as the internal transmission linkage components which may require the lever 10 to be pivoted toward the driver prior to rotation from a park position to any operative forward or reverse gear or neutral will also not be described as such is conventional in the art and does not form part of the present invention.

Accordingly, the lever 10 includes a first end portion 12 adapted to be pivotally and/or rotatably coupled to a vehicle steering column in a conventional manner for selection of various transmission gears or operative states, including park, reverse, neutral, drive and low gears (PRNDL). The first end portion 12 has a first end 14 adapted to be pivotally and/or rotatably coupled to a vehicle steering column, and an opposed second end 16.

The lever 10 also includes an axially outermost second end portion 18 also having a first end 20 and an opposed second end 22. Opposing ends 16 and 20 of the first and second end portions 12 and 18, respectively, are spaced apart by an intermediately disposed actuator 28.

In order that the first and second end portions 12 and 18 may function together as a transmission gear shift selector, the first and second end portions 12 and 18 are rigidly joined together for unitary movement. One fixed joining means is illustrated in FIGS. 1 and 2 by way of example and includes a rigid tubular member or rod 30 which may have any desired shape, depending upon the overall shape of the lever 10, other than the elongated, linear shape shown in FIG. 1.

The tubular member 30 can be formed in a number of different ways and/or, fixedly joined to the first and second end portions 12 and 18 by a number of different techniques. As shown in FIG. 1, which depicts one aspect or example of the tubular member 30, the tubular member 30 defines a separate member distinct from the first and second end portions 12 and 18. In this aspect, at least the end portion of the tubular member 30 which extends through the first end portion 12 of the lever 10 is hollow for accommodating conductors or wires, as described hereafter. The opposite end of the tubular member 30 may be solid or also formed with a bore extending therethrough. The tubular member 30 is preferably formed of a rigid, suitable material having the requisite strength to rigidly join the first and second end portions 12 and 18 into a rigid, unitary structure as well as to accommodate the various forces applied to the lever 10 during rotation of the lever 10 to a selected transmission gear. Thus, the tubular member 30 may be formed of a high strength plastic, metal, etc.

Alternate construction methods for the tubular member 30 may also include molding the tubular member 30 as a unitary, one-piece part of either the first or second end portions 12 and 18 of the lever 10. In this aspect of the invention, the exposed end of the tubular member 30, which is inserted into a hollow bore formed in the other of the first and second end portions 12 and 18, is secured in place by means of a high strength adhesive, keyed cross section or interlocking key means, etc.

According to the present invention, the actuator 28 is separately movable independent of the lever 10 to switch contacts carried internally within the actuator 28 between various positions to open and close electrical circuits adapted for controlling various vehicle operating functions or devices, such as windshield wipers, windshield wash and mist operations, headlights, etc.

As shown in FIG. 2, a printed circuit board or other substrate 34 is preferably fixedly mounted on the first end 16 of the first end portion 12 of the lever 10. Various mounting means such as an adhesive, heat staking, as well as mechanical fasteners may be employed. The printed circuit board 34, as is conventional, includes at least one and preferably a plurality of discrete, electrically isolated traces or contacts 36 which are separately connected to conductors 38 extending through the hollow bore of one end portion of the tubular member 30 and the first end portion 12 of the lever 10. The conductors 38 exit the first end 14 of the first end portion 12 for connection to a suitable connector, not shown, attached to the vehicle body wiring harness or directly to vehicle operating devices, such as the windshield wipers, headlights, etc. It should be noted that the printed circuit board 34 has a central aperture adapted to fit over the tubular member 30 extending between the second end 16 of the first end portion 12 and the first end 20 of the second end portion 18 of the lever 10.

Next, a contactor 40 is movably mounted relative to the fixed printed circuit board 34 and is coupled to an outer actuator housing 42 for movement with movement of the housing 42. The contactor 40 carries at least one and preferably a plurality of leaf contacts 44 which are arranged to slide or wipe over the conductive traces 36 on the printed circuit board 34 during rotation of the actuator housing 42 relative to the fixed or stationary printed circuit board 34 as well as to optionally contact fixed contacts on the printed circuit board 34 during translational movement of the actuator body 42 coaxially along the axis of the lever 10. The contactor 40 is fixedly mounted in an internal seat 46 formed within the actuator housing 42 also by adhesive, heat staking, mechanical fastening means, etc.

According to one aspect of the invention, the actuator 28 is adapted for translational or linear movement along the longitudinal axis of the lever 10. A return biasing member or coil spring 48 is mounted internally within the actuator housing 42 between the contactor 40 and an internal seat 50 formed within the actuator housing 42. The function of the spring 48 will be described hereafter in conjunction with operation of the actuator 28.

A detent surface denoted generally by reference number 56 is shown in FIGS. 1 and 2 as being formed in the end of the actuator housing 42 adjacent to the first end 20 of the second end portion 18 of the lever 10. It will be understood, however, that the detent surface 56 could also be formed on the first end 20 of the second end portion 18 of the lever 10.

The detent surface 56 may be formed to include a plurality of circumferentially spaced projections, such as a series of alternating ridges and recesses. At least one detent plunger and, preferably, a pair of circumferentially spaced and diametrically opposed plungers 58 are biased into engagement with the detent surface 56 by means of biasing springs 60 mounted within bores in the first end 20 of the second end portion 18 of the lever 10. The plungers 58 ride within the detents or ridges formed in the detent surface 56 and define at least one and preferably a plurality of distinct positions for the actuator 28 relative to the fixedly joined first and second end portions 12 and 18 of the lever 10. Each distinct rotated position of the detent plunger 58 in one of the distinct recesses in the detent surface 56 defines a different contact arrangement between the leaf contacts 44 on the contactor 40 and the conductive traces 36 on the printed circuit board 34 to open and/or close electrical circuits between the leaf contacts 44 and the conductive traces 36 to provide power or signals through the conductors 38 to various vehicle operating circuits or devices.

The following example of one set of switch functions provided by the actuator 28 will be understood to be by way of example only as the actuator 28 through the conductive traces 36 and the contacts 44 may provide other switch functions and/or to control other operative circuits or devices on a vehicle.

Thus, by way of example only, the actuator 28 will be provided with an "off" or home position designated by a preset 0° rotational positional relative to the longitudinal axis of the lever 10. Rotating the actuator 28 backwards or away from the driver a predetermined angular amount, such as 15° as defined by a first backward positioned detent in the detent surface 56 causes backward rotation of the contactor 40 bringing at least one of the leaf contacts 44 on the contactor 40 into contact with one of the conductive traces 36 on the printed circuit board 34 to generate a signal through the conductors 38 to activate the windshield wipers at low speed for one mist cycle. After a predetermined time period as established by the washer pump or manual rotation of the actuator 28 back to the "off" or home position, the washer pump will be deactivated.

It is preferred that the backward rotation of the actuator housing 42 to a position corresponding to activation of the windshield wipers in a mist cycle be momentary with an automatic return to the "off" or home position. This can be achieved by means of an internal spring or other biasing member. Alternately, as shown in FIG. 1, the circumferentially spaced detent surface 57 in a rearward direction from the "off position" is elongated enabling sufficient backward rotation of the actuator body 42 from the home position to close a circuit between one leaf contact 44 and at least one conductive trace 36 for the wiper mist cycle. Release of the backward rotative force applied to the actuator 28 will enable the detent plunger 58 to ride back downward along the surface 57 to the home position.

Next, the actuator 28 may be rotated in a so-called "forward" direction toward the driver through a plurality of distinct positions, each spaced, by way of example only, 5° apart starting with a first position defined at a 50 rotation from the "off" or home position of the actuator 28. Each of these positions defined by a separate detent on the detent surface 56 and a separate connection via the contacts 44 on the contactor 40 and the traces 36 on the printed circuit board 34 may be used to control intermittent wiper operation wherein each rotated position defines a different amount of delay between each successive wiper cycle.

As is conventional, the intermittent delay feature can be easily implemented by means of a series of circumferentially or arcuately disposed resistors on one of the traces 36 on the printed circuit board which are selectively shorted out of the wiper drive circuit to control the amount of time delay between each successive wiper operation.

After the fifth delay position, a greater amount of angular rotation to the next angularly displaced position from the home position or at a total angle of 40° will move the actuator 28 in a position corresponding, in the present example, to operation of the vehicle windshield wipers at a low speed. Further rotation, such as an additional 15°, to the next detent position will close a circuit through the contacts 44 and the traces 36 causing windshield wiper operation at a high speed.

After the driver determines that wiper operation is no longer required, the driver simply rotates the actuator 28 back to the "off" or home position ceasing wiper operation.

At any time, the driver may activate the windshield washer pump for a windshield wash and wipe operation. This is implemented via a circuit formed by the conductive traces 36 and one or more leaf contacts 44 on the contactor 40 through a translational or axial movement of the actuator 28 along the longitudinal axis of the lever 10. Only a short amount of movement is required to overcome the force of the return biasing spring 48 and to bring an operator rod 64, for example, extending from an interior solid portion of the actuator body 42 into contact with and moving a leaf contact on the contactor 40 into mating contact with a spaced contact on the printed circuit board 34. When the driver releases the axial movement force on the actuator 28, the return spring 48 will return the actuator housing 42 to the normal position shown in FIG. 1.

It should be noted that during the axial movement of the actuator housing 42 toward the first end portion 12 of the lever 10, the biasing springs 60 have a sufficient length to enable the plungers 58 to follow the axial movement of the actuator housing 42 and remain in the same detents associated with the "off" or home position of the actuator 28.

It should also be noted that the second end portion 18 is formed with a sufficient length such that the driver can easily grasp the second end portion 18 to pivot and/or rotate the lever 10 to select the desired transmission gear or state without inadvertently contacting the actuator 28. At the same time, the actuator 28 is still positioned toward the outer end of the lever 10 for convenient access when the driver wishes to activate the switch functions provided by the actuator 28.

In assembling the actuator 28 on the lever 10, one preferred assembly method is to mount the actuator 28 about the tubular member 30 extending from one of the first or second end portions 12 and 18 of the lever 10 prior to mounting the outer end portion of the tubular member 30 in the bore in the other of the first or second end portions 12 or 18. In this arrangement, the opposed generally circular outer ends 52 and 54 of the actuator housing 42 will slidably overlie the exterior surfaces of the first and second end portions 12 and 18 adjacent the second end 16 of the first end portion 12 and the first end 20 of the second end portion 18, respectively. The return spring 48 and the spring 60 biasing the detent plungers 58 into the detents on the detent surface 56 will bias the actuator 28 to a centered position between the first and second end portions 12 and 18 of the lever 10.

In addition to the above described and illustrated operation of the actuator 28 to control windshield wiper, wash and mist operations in a vehicle on a transmission shift lever 10, the actuator 28 of the present invention may also be constructed in a similar manner to control vehicle headlights between off, low beam, high beam and, optionally, with separate front and/or rear fog light activation by means of a detent on the detent surface 56 associated with each headlight state and a suitable arrangement of leaf contacts 44 and conductive traces 36 to open and close the headlamp circuits as necessary to provide the selected headlight, parking light and fog light operation.

It will also be understood that the present invention contemplates an additional or separate detent mechanism and rotatable member on the actuator to separately control other vehicle circuits or devices. This arrangement would enable the switch actuator of the present invention to control the complete windshield wiper operation as well as controlling the vehicle headlamp operation.

In summary, there has been disclosed a unique combination transmission shift lever and vehicle operating circuit switch apparatus which uniquely mounts a vehicle operating circuit switch controlling selected vehicle functions, such as windshield wipers, headlamps, etc., on a transmission shift lever. This eliminates a separate steering column stalk switch for the wiper or headlight switches thereby significantly reducing steering column construction and assembly cost since a single lever now performs multiple functions.

What is claimed is:

1. In a vehicle having a transmission shift lever mounted on a steering column, the improvement comprising:
   the lever extending from one end adjacent a vehicle steering column and to an opposed outer end;
   an actuator carried between the one end and the outer end of the lever and mounted for independent coaxial translation relative to the lever; and
   switch means, carried with the actuator, for forming a circuit upon movement of the actuator from one position to another position, the circuit connected to a vehicle operating device to control the activation and deactivation of a vehicle operating device in response to movement of the actuator.

2. The improvement of claim 1 wherein the switch means comprises:
   a board carrying at least one conductive trace, the board fixedly mounted on one of the actuator and the lever; and
   a contactor carried by the other of the actuator and the lever and carrying a contact mounted for engagement with the at least one conductive trace upon movement of the actuator.

3. The improvement of claim 1 wherein the lever further comprises:
   a first end portion extending from the one end and termination in a first end, a second end portion having a second end, the second end portion extending from the second end to the outer end and rigidly joined to the first end portion to couple the first and second end portions for unitary movement with respect to the vehicle steering column.

4. The improvement of claim 3 wherein the first end of the first end portion is spaced from the second end of the second end portion.

5. The improvement of claim 4 wherein the actuator is movably mounted between the first and second ends of the first and second end portions, respectively.

6. The improvement of claim 5 further comprising:
   a board carrying at least one conductive trace, the board fixedly mounted on the first end of the first end portion of the lever; and
   a contactor carried by the actuator and having a contact arranged for engagement with the at least one conductive trace upon movement of the actuator.

7. The improvement of claim 1 further comprising:
   a board carrying an electric contact, the board fixedly mounted on the lever;
   an electrical contact carried on the other of the actuator and the lever; and
   the actuator mounted on the lever for translational movement along a longitudinal axis of the lever from a first normal position to a second position wherein the electrical contact on the actuator and the electrical contact on the board engage to complete a circuit therethrough.

8. The improvement of claim 7 further comprising:
   means, mounted between the lever and the actuator, for biasing the actuator to the first normal position.

9. In a vehicle having a transmission shift lever mounted on a steering column, the improvement comprising:
   the lever extending from one end adjacent a vehicle steering column and to an opposed outer end;
   an actuator carried between the one end and the outer end of the lever and mounted for independent rotational and coaxial translational movement relative to the lever; and
   switch means, carried with the actuator, for forming a circuit upon movement of the actuator from one position to another position, the circuit connected to a vehicle operating device to control the activation and deactivation of a vehicle operating device in response to movement of the actuator.

10. The improvement of claim 9 further comprising:
    a detent formed on one of the actuator and the lever; and
    a detent follower carried on the other of the actuator and the lever and movably engagable with the detent to define at least one distinct position of the actuator relative the lever.

11. The improvement of claim 10 wherein the detent follower comprises a biased plunger.

12. The improvement of claim 9 further comprising:
    a plurality of circumferentially spaced detents formed on one of the actuator and the lever;
    a detent follower carried on the other of the actuator and the lever and movably engagable with the plurality of detents to define a plurality of distinct positions of the actuator relative to the lever;
    a board carrying a plurality of conductive traces, the board fixedly mounted on one of the actuator and the lever; and
    a contactor carried by the other of the actuator and the lever and carrying a plurality of electrical contacts mounted for engagement with at least one conductive trace on the board upon movement of the actuator.

13. A vehicle steering column switch apparatus comprising:
    a transmission shift lever extending from one end adjacent a vehicle steering column and to an opposed outer end;
    an actuator carried between the one end and the outer end of the lever and mounted for independent coaxial translation relative to the lever; and
    switch means, carried with the actuator, for forming a circuit upon movement of the actuator from one position to another position, the circuit connected to a vehicle operating device to control the activation and deactivation of a vehicle operating device in response to movement of the actuator.

14. The apparatus of claim 13 wherein the switch means comprises:

a printed circuit board carrying at least one conductive trace, the printed circuit board fixedly mounted on one of the actuator and the lever; and a contactor carried by the other of the actuator and the lever and carrying a contact mounted for engagement with the at least one conductive trace upon movement of the actuator.

15. The apparatus of claim 13 wherein the lever further comprises:

a first end portion extending from the one end and terminating in a first end, a second end portion having a second end, the second end portion extending from the second end to the outer end and rigidly joined to the first end portion to couple the first and second end portions for unitary movement with respect to the vehicle steering column.

16. The apparatus of claim 15 wherein the first end of the first end portion is spaced from the second of the second end portion.

17. The apparatus of claim 16 wherein the actuator is movably mounted between the first and second ends of the first and second end portions, respectively.

18. The apparatus of claim 17 further comprising:

a printed circuit board carrying at least one conductive trace, the printed circuit board fixedly mounted on the first end of the first end portion of the lever; and a contactor carried by the actuator and having a contact arranged for engagement with the at least one conductive trace upon movement of the actuator.

19. The apparatus of claim 13 further comprising:

a board carrying an electrical contact, the board fixedly mounted on the lever;

an electrical contact carried on the other of the actuator and the lever; and the actuator mounted on the lever for translational movement along a longitudinal axis of the lever from a first normal position to a second position wherein the electrical contact on the actuator and the electrical contact on the board engage to complete a circuit therethrough.

20. The apparatus of claim 19 further comprising:

means, mounted between the ever and the actuator, for biasing the actuator to the first normal position.

21. In a vehicle having a transmission shift lever mounted on a steering column, the improvement comprising:

the lever extending from one end adjacent a vehicle steering column and to an opposed outer end;

an actuator carried between the one end and the outer end of the lever and mounted for independent rotational and coaxial translational movement relative to the lever; and switch means, carried with the actuator, for forming a circuit upon movement of the actuator from one position to another position, the circuit connected to a vehicle operating device to control the activation and deactivation of a vehicle operating device in response to movement of the actuator.

22. The apparatus of claim 21 further comprising:

a detent formed on one of the actuator and the lever; and a detent follower carried on the other of the actuator and the lever and movably engagable with the detent to define at least one distinct position of the actuator relative the lever.

23. The apparatus of claim 22 wherein the detent follower comprises a biased plunger.

24. The apparatus of claim 21 further comprising:

a plurality of circumferentially spaced detents formed on one of the actuator and the lever;

a detent follower carried on the other of the actuator and the lever and movably engagable with the plurality of detents to define a plurality of distinct positions of the actuator relative to the lever;

a board carrying a plurality of conductive traces, the board fixedly mounted on one of the actuator and the lever; and a contactor carried by the other of the actuator and the lever and carrying a plurality of electrical contacts mounted for engagement with at least one conductive trace on the board upon movement of the actuator.

* * * * *

UNITED STATES PATENT AND TRADEMARK OFFICE
CERTIFICATE OF CORRECTION

PATENT NO. : 6,172,312 B1
DATED : January 9, 2001
INVENTOR(S) : John M. Maranzano Page 1 of 1

It is certified that error appears in the above-identified patent and that said Letters Patent is hereby corrected as shown below:

Column 5,
Line 64, please delete "50" and insert -- 5° --.

Column 10,
Line 4, please delete "ever" and insert -- lever --.

Signed and Sealed this

Twenty-ninth Day of January, 2002

Attest:

Attesting Officer

JAMES E. ROGAN
Director of the United States Patent and Trademark Office